Jan. 29, 1935.  D. B. HOWARD  1,989,095
WIND DIRECTION INDICATING AIRWAYS BEACON
Filed Oct. 16, 1929   2 Sheets-Sheet 1
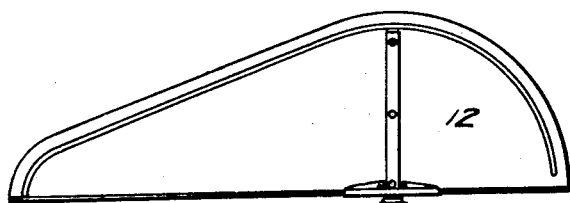
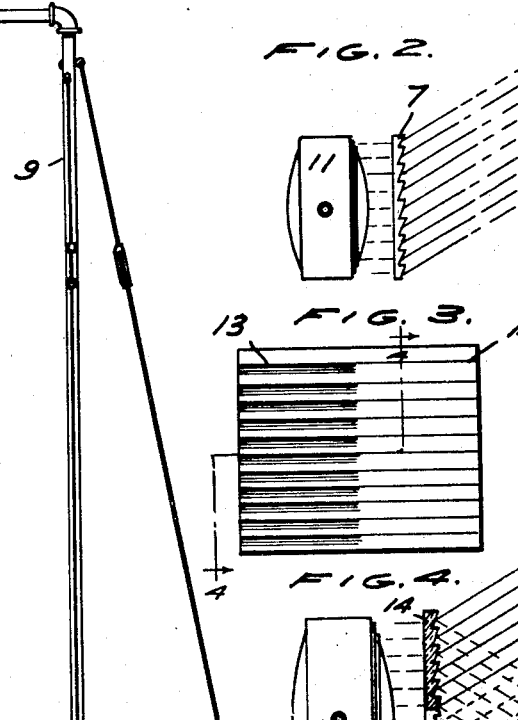
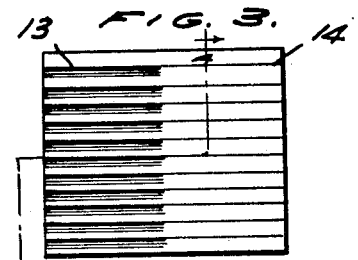
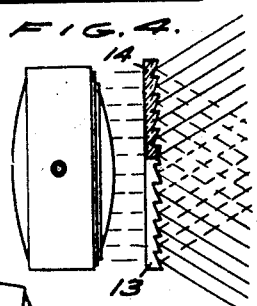
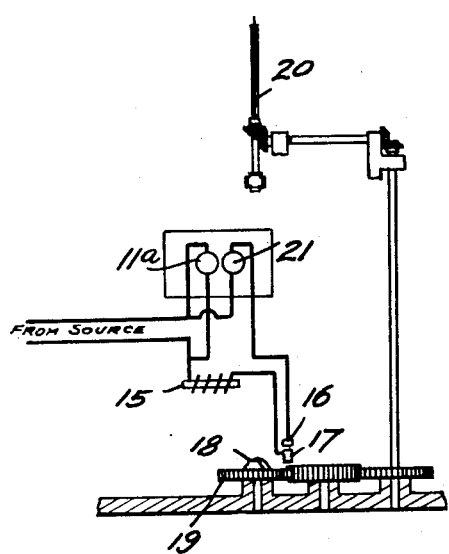
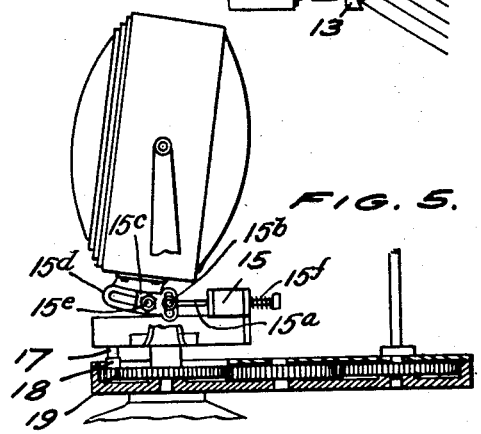
INVENTOR
DUDLEY B. HOWARD
BY Robert H. Young
ATTORNEY

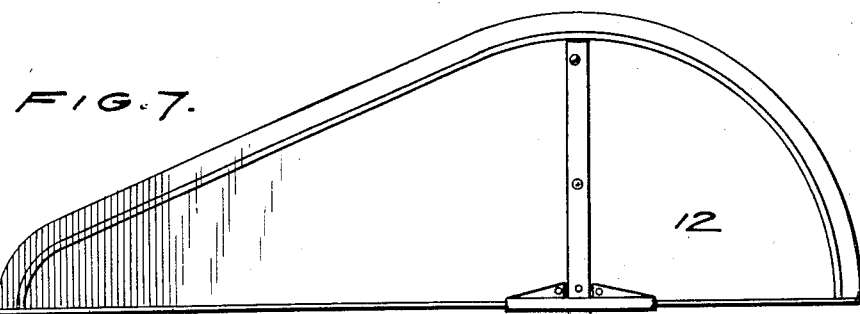
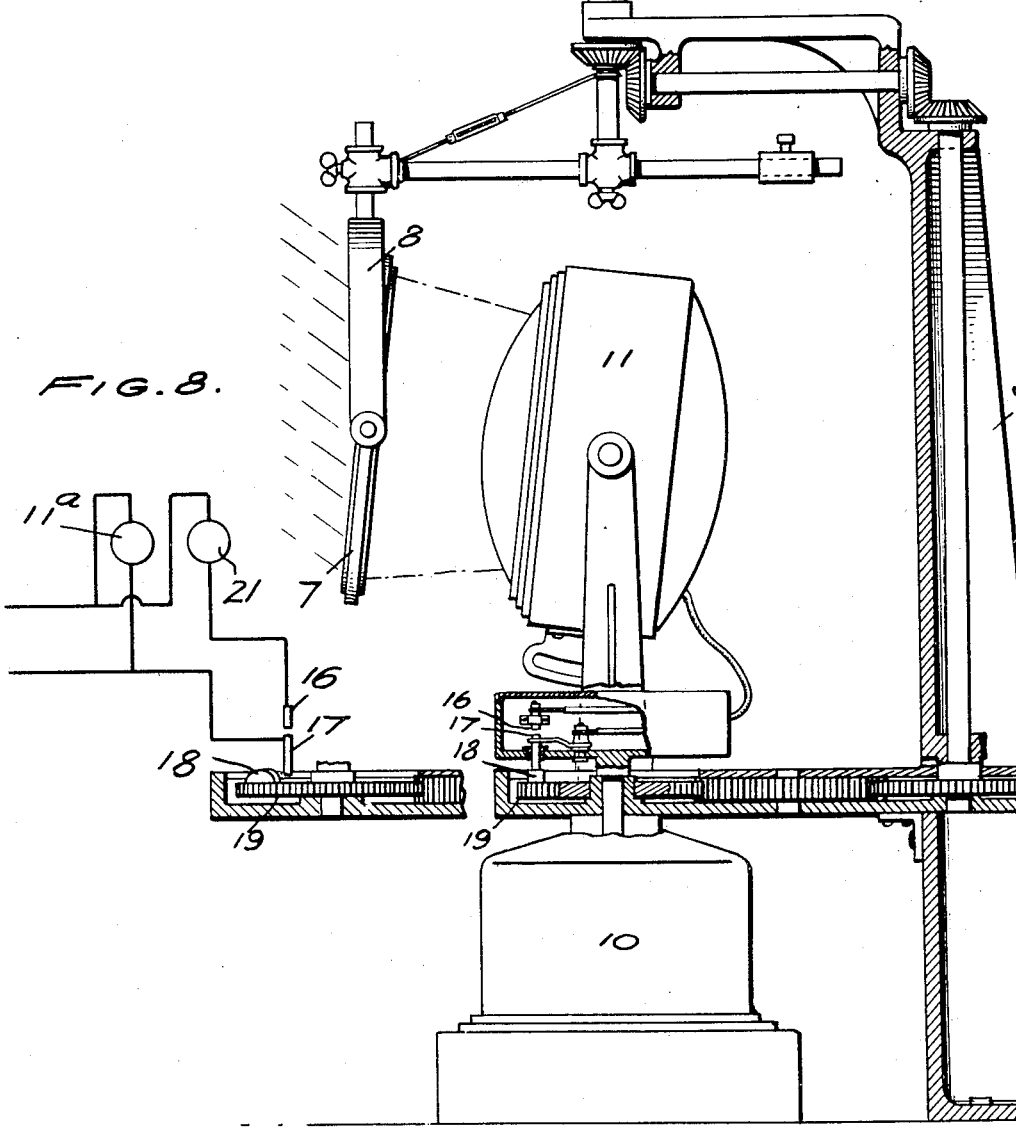

Patented Jan. 29, 1935

1,989,095

UNITED STATES PATENT OFFICE 1,989,095

WIND DIRECTION INDICATING AIRWAYS BEACON

Dudley B. Howard, Washington, D. C.

Application October 16, 1929, Serial No. 400,044

13 Claims. (Cl. 73—55)

(Granted under the act of March 3, 1883, as amended April 30, 1928; 370 O. G. 757)

The invention described herein may be manufactured and used by or for the Government for governmental purposes without the payment to me of any royalty thereon.

The invention relates to terrestrial visual wind direction indicators used in aviation to inform pilots in the air of the surface wind direction, and in particular to illuminated indicators such as are used at night.

It is the primary object of the invention to increase the range of the indicators of this type.

A further object is to utilize the far-reaching beams of revolving airways beacons as indicating means.

Other objects and advantages may appear as the following specific description is read in connection with the accompanying drawings, in which:

Figure 1 is a side elevation of a revolving beacon with a wind indicating attachment applied thereto;

Figure 2 is a diagrammatic view of the beam-refractor and beacon lamp, showing the manner in which light rays are refracted;

Figure 3 is a front elevation of a modified form of refractor;

Figure 4 is a diagrammatic view of the modified refractor in conjunction with the beacon lamp, the refractor being shown in vertical section on line 4—4 of Figure 3;

Figure 5 is a fragmentary side elevation of a beacon showing means for tilting the lamp to cause deviation of the beam;

Figure 6 is a similar view showing the wind-responsive means for actuating the lamp-tilting means;

Figure 7 is a side view, partly in section, of a beacon similar to Figure 6 showing a beam deviating refractor in use with means for momentarily increasing the intensity of the beacon light; and, Figure 8 is a diagrammatic view of the light circuit embodied in the structure of Figure 7.

In accordance with the present invention, it is proposed to indicate wind direction by providing an airways beacon with means for deviating the light beam in a vertical plane at a predetermined position in the path of movement around its axis. The selected position may be either the up-wind projecting position of the beam or the down-wind position. It is believed to be most natural to consider deviation of the beam in its down-wind position as indicating wind blowing from the beacon in the direction the beam is pointing. Assuming that the down-wind position has been selected, deviation in a vertical plane, or "flipping", of the beam out of its nearly horizontal path once during each revolution of the beacon should indicate clearly to anyone observing it that the wind is blowing in that direction.

The beam may be deviated in various ways, of which two will be described for the purpose of illustration.

In Figure 1 of the drawings, means are disclosed for refracting the beam to cause the desired deviation. By using the refraction method, the wind indicating device may be in the form of an attachment requiring no alteration of the standard beacon. Such an attachment may take the form of a refractor lens 7 mounted on a swinging frame 8 carried by support 9. Frame 8 is pivoted on a vertical axis coincident with the axis of rotation of the beacon in connection with which it is to be used. The numeral 10 designates such a beacon, which is of standard construction. The lens 7 is supported at all times in a position clear of the lamp 11 of the beacon and wherein it will be aligned with the projecting lens of the lamp once during each rotation of the latter. When in alignment with the lamp lens, the refractor lens will be penetrated by the light beam. The refractor lens is held preferably on the down-wind side of the beacon lamp by wind-sensitive means such as the vane 12.

The refractor lens may be of the prismatic form shown in Figure 2. In this instance, the transverse prismoidal sections are similarly disposed from top to bottom so that the entire beam will be deviated in one direction in a vertical plane, which may be either upward or downward as preferred. Upward deviation may sometimes cause the beam to illuminate low-hanging clouds and thereby make the down-wind pointing position of the beam more noticeable. Downward deviation, on the other hand, should always cause the beam to touch trees and other terrestrial objects, but the illumination of these objects may not be as distinctly noticeable.

In Figures 3 and 4, a double refractor lens is illustrated. This lens has one section 13 adapted to deviate the beam upwardly and another section 14 adapted to deviate it downwardly. The two sections are divided on a vertical line so that the beam will penetrate them in succession, being "flipped" up and then down, or vice versa. Such increased amplitude of deviation of the beam should be especially effective in indicating wind direction.

Instead of deviating the beam by refraction, which has the disadvantage of reducing the light intensity somewhat, the same result can be accomplished by tilting the beacon lamp on its trunnions. In this manner, the full intensity of the beam will be maintained.

Various means for tilting the lamp might be suggested. A convenient mechanism is shown in Figures 5 and 6, wherein the numeral 15 designates a solenoid magnet mounted on the lamp yoke and operatively connected with the lamp proper. The solenoid is connected in a normally open circuit in parallel with the light circuit of the lamp. The solenoid coil is attached directly to the base portion of the yoke, whereas the core 15a has its inner end pivotally connected as at 15b to a plate 15c adjustably mounted on a lug 15d projecting below the lamp proper. A bolt 15e serves to secure plate 15c in the desired adjusted relation with respect to the lug to determine the angle of elevation of the light beam of the lamp above the horizontal. A coiled extension spring 15f connects the outer end of the solenoid core 15a to the coil of the core and tends to maintain the core, and therefore the lamp, in predetermined angular setting. A pair of relatively movable contacts 16 and 17 are adapted, when brought together, to close the solenoid circuit. The contacts are carried by the lamp, as shown in Figure 7, and contact 17 is yieldably supported to be deflected against the fixed contact 16 by an actuating cam 18 provided on the stationary base of the beacon. The cam is mounted for adjustment around the beacon axis on a rotatable member 19, which should be in the form of a gear in order that it may mesh with other gears of a system of gears and shafts constituting convenient means for connecting the cam with wind vane 20. The gear ratios should be such that the cam will make one revolution around the beacon axis for each revolution of the wind vane. The position of the cam on the gear should bear such angular relation to the wind vane that the cam will close contacts and close the solenoid circuit in the position of the lamp wherein its beam is pointing downwind. Closing the circuit will energize the solenoid and cause the lamp to rock on its horizontal axis against the resisting action of spring 15f, thereby tilting the beam noticeably as desired.

The effect of the deviated beam will be rendered more striking by increasing the candlepower of the light momentarily. This may be accomplished by installing in the lamp a bulb 21, or filament, in addition to the usual bulb 11a. The bulb 21 is connected in series with the solenoid circuit.

By omitting the solenoid, the mechanism of Figures 5 and 6 can be used with the refractor lens of Figure 1 to prevent decreased light intensity of the beam when deviated by refraction. This combination of features is illustrated in Figures 7 and 8.

While two ways of deviating the beacon beam have been shown, there may be other mechanical means for accomplishing the same purpose. It is to be understood that such further means fall within the broad scope of the appended claims.

I claim:—

1. In a device of the class described, the combination with a beacon mounted to rotate about a vertical axis to project an uninterrupted sweeping light beam, of means for deviating the light beam in a vertical plane, and means sensitive to changes in wind direction for causing the deviating means to become operative only in a predetermined position in the path of rotation of the beam that is coincident with the existing wind direction.

2. In a device of the class described, the combination with a beacon mounted to rotate about a vertical axis and to project a sweeping light beam of means for amplifying the light intensity of the beam, means associated with the beam for deviating said beam, and means sensitive to changes in wind direction for causing the deviating means to become operative in a predetermined position in the path of revolution of the beam with reference to the existing wind direction.

3. In a device of the class described, the combination with a beacon mounted to rotate about a vertical axis and to project a sweeping light beam, of means for increasing the light intensity of the beam, and means sensitive to changes in wind direction for causing the intensity increasing means to become operative in a predetermined position in the path of rotation of the beam with reference to the existing wind direction.

4. In a device of the class described, the combination with a beacon mounted to rotate about a vertical axis and to project a sweeping light beam at a predetermined normal angle to the horizontal, of means for deviating the light beam successively upwardly and downwardly from its normal angular setting, and means sensitive to changes in wind direction for causing the deviating means to become operative in a predetermined position in the path of rotation of the beam with reference to the existing wind direction.

5. In a device of the class described, the combination with a beacon mounted to rotate about a vertical axis and to project a sweeping light beam of means for deviating the light beam in a vertical plane, means sensitive to changes in wind direction for causing the deviating means to become operative in a predetermined position in the path of rotation of the beam with reference to the existing wind direction, and means for increasing the light intensity of the beam during deviation.

6. In a device of the class described, the combination with a beacon mounted to rotate about a vertical axis and to project a sweeping light beam of means disposed in the path of said beam and operable independently of the operation of said beam for refracting the light beam in a vertical plane, said means comprising a wind operated device sensitive to changes in wind direction for causing the refracting means to become operative in a predetermined position in the path of rotation of the beam with reference to the existing wind direction.

7. In a device of the class described, the combination with a beacon mounted to revolve about a vertical axis and to project a sweeping light beam of means for refracting the light beam in a vertical plane, means sensitive to changes in wind direction for causing the refracting means to become operative in a predetermined position in the path of revolution of the beam with reference to the existing wind direction, and means for increasing the light intensity of the beam during refraction.

8. In a device of the class described, a lamp including a source of light and means for projecting a beam, means disposed in the path of said beam for deviating the beam by refraction intermittently, and means for increasing the light intensity of the beam at the source at the time of refractions.

9. A wind-direction indicating beacon including a light beacon rotatable about a vertical axis, means for tilting the beacon to deviate the beam vertically from its normal path in a horizontal plane, and wind-responsive means for causing the beacon-tilting means to become operative in a predetermined position in the path of rotation of the beam with reference to existing wind direction.

10. A wind direction indicating beacon comprising a beacon mounted to rotate about a vertical axis and to project a sweeping beam, of means for varying the candle power of the beam, and means sensitive to changes in wind direction for causing the candle-power varying means to become operative temporarily in a predetermined position in the path of rotation of the beam with reference to the existing wind direction.

11. An attachment for beacons of the type wherein a light beam is caused to rotate about a vertical axis, comprising a support, means mounted upon the support for causing deviation of the light beam laterally in opposite directions with respect to the direction of rotation of said light beam, and means sensitive to changes in wind direction for causing the deviating means to become operative only in a predetermined position in the path of revolution of the beam with reference to the existing wind direction.

12. In combination with a beacon mounted to rotate about a vertical axis for producing a sweeping beam of light, of means for varying the direction of said sweeping beam of light from its normal path of rotation, and means sensitive to changes in wind direction for causing the varying means to become operative only in a predetermined position in the path of rotation of the beam.

13. In combination with a beacon mounted to rotate about a vertical axis for producing a sweeping beam of light, of means for deviating the light beam successively in opposite directions from its path of rotation to effect a compound motion of said light beam, and means sensitive to changes in wind direction for causing the deviating means to become operative in a predetermined position in said path of rotation of the beam with reference to the existing wind direction.

DUDLEY B. HOWARD.